June 24, 1969   F. REMENSPERGER ET AL   3,451,569
APPARATUS FOR DELIVERING DOUGH PORTIONS
Original Filed Oct. 1, 1962   Sheet 1 of 2

INVENTORS
**Franz Remensperger
Max Cramer &
Walter Schnee**

BY *Spencer & Kaye*
ATTORNEYS

United States Patent Office 3,451,569
Patented June 24, 1969

3,451,569
APPARATUS FOR DELIVERING DOUGH PORTIONS
Franz Remensperger, Bahnhofstrasse 44, Saint Georgen, Germany, and Max Cramer, Rietheimer Strasse 59, and Walter Schnee, Hebelstrasse 3, both of Villingen, Germany
Continuation of application Ser. No. 227,202, Oct. 1, 1962. This application June 8, 1967, Ser. No. 644,689
Claims priority, application Germany, Sept. 30, 1961, W 30,802
Int. Cl. B65g 47/71
U.S. Cl. 214—309                                       8 Claims

ABSTRACT OF THE DISCLOSURE

Apparatus for conveying successive batches of unbaked dough portions from fermentation carriers to the net conveyor of a baking oven, which apparatus includes conveyors for guiding the fermentation carriers in a first direction, further conveyors for guiding the fermentation carriers with their dough portions in a second direction perpendicular to the first direction and for removing the dough portions from their carriers while continuing to convey the dough in the second direction, and additional conveyors for conveying the empty fermentation carriers away in a direction perpendicular to the second direction.

Cross reference to related application

This is a continuation of application Ser. No. 227,202, filed on Oct. 1, 1962, and now abandoned.

Background of the invention

The present invention relates to devices for conveying successive groups of unbaked dough portions in a uniform manner from fermentation carriers to a net conveyor of a baking oven and for returning the unloaded fermentation carriers to a loading station in the simplest possible manner.

It is already known to provide delivery devices having a conveyor part which swings back and forth between a receiving station and a delivery station. Such devices, in addition to being usable only with larger pieces of dough, have the disadvantage that they can not produce a continuous flow of the dough portions.

Summary of the invention

It is a primary object of the present invention to overcome these disadvantages.

A more specific object of the present invention is to provide a device of the above-mentioned type which may be employed for all possible types of dough portions and which will continuously convey the dough portions from the fermentation carriers to the net conveyor of a baking oven.

These and other objects according to the present invention are achieved by the provision of apparatus for conveying dough portions from fermentation carriers to the net conveyor of a baking oven, which apparatus includes roller type conveyor means for conveying loaded fermentation carriers in a first direction, first forwarding means operatively associated with the conveyor means, transfer means operatively associated with the forwarding means, second forwarding means disposed beneath the transfer means, and transport means operatively associated with the second forwarding means. The first forwarding means are arranged for forwarding the loaded carriers toward the net conveyor in a second direction transverse to the first direction and include at least one guide bar extending in the first direction and movable in the second direction across the conveyor for moving the fermentation carriers in the second direction. The transfer means are arranged for removing the dough portions from the carriers and for conveying them in the second direction to the net conveyor. The second forwarding means convey the unloaded carriers beyond the front end of the transport means, after which the transport means carry the unloaded carriers away in a direction transverse to the second direction.

The second forwarding means are operatively associated with the first forwarding means, and are preferably in line therewith, for receiving the fermentation carriers as they pass below the transfer means.

Such apparatus is capable of producing a rapid and uninterrupted conveyance of dough portions to the net conveyor, as well as a rapid and uninterrupted delivery of loaded fermentation carriers to the first forwarding means and removal of emptied fermentation carriers from the second forwarding means.

Description of the preferred embodiment

Figure 1:
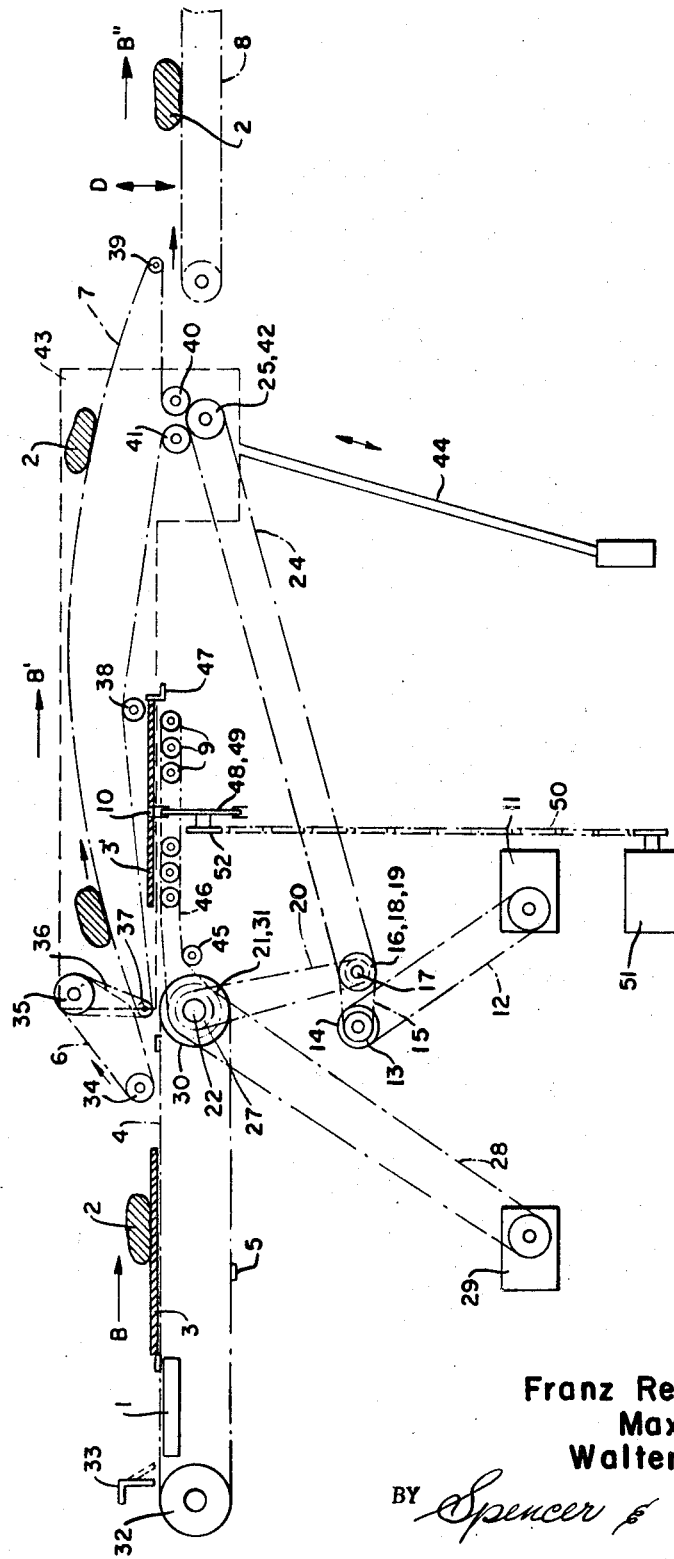
FIGURE 1 is a schematic elevational view of a preferred embodiment of the present invention.
Figure 2:
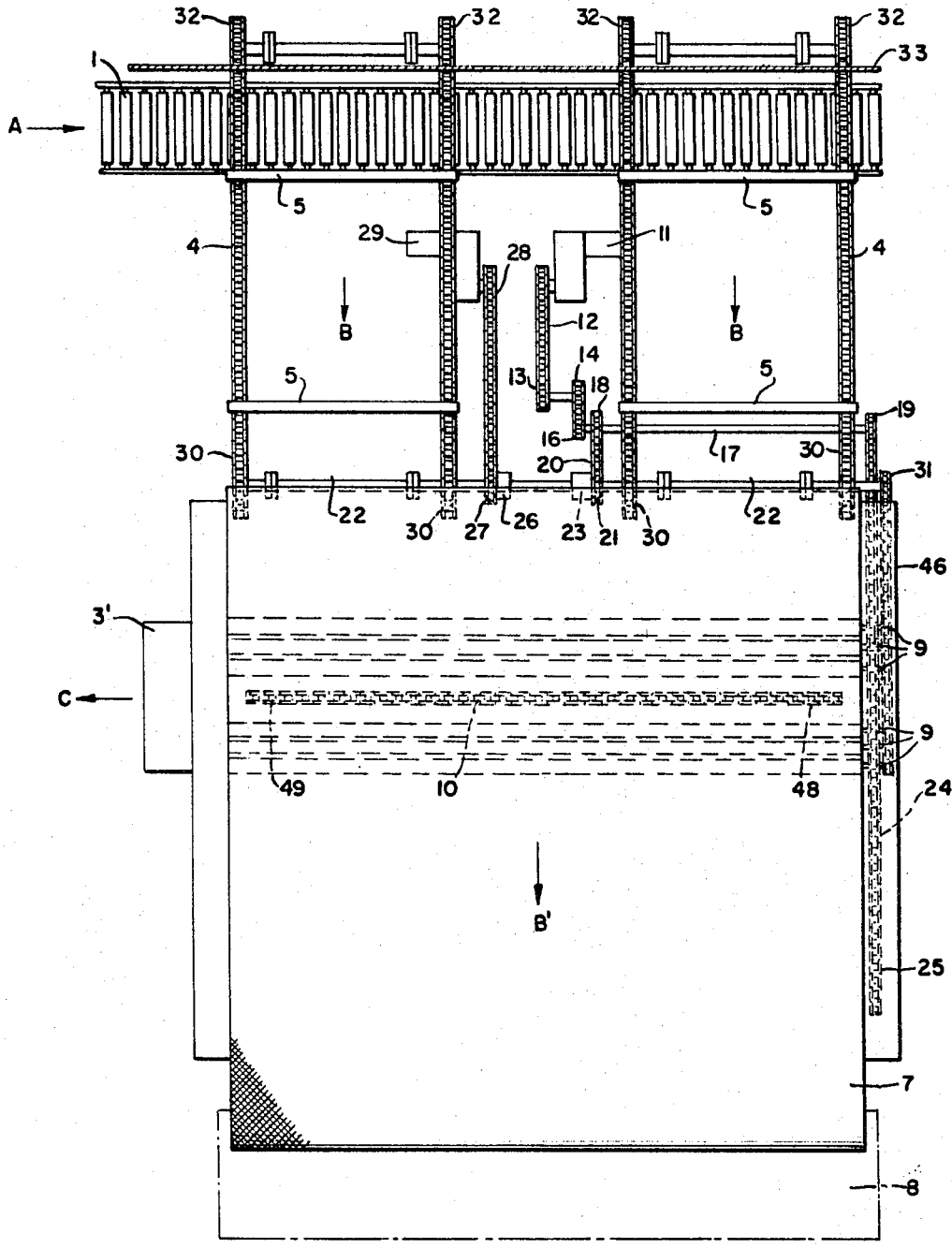
FIGURE 2 is a schematic plan view of the embodiment of FIGURE 1.

Referring to FIGURES 1 and 2 together, the illustrated arrangement includes a roller-type conveyor 1 composed of a plurality of rollers and arranged to deliver fermentation plates 3 in a first direction A parallel to the longitudinal axes of the carriers. Each carrier 3 is loaded with a plurality of dough portions 2 preferably arranged side by side with their long axes perpendicular to the longitudinal axes of the carriers 3.

Operatively associated with the conveyor 1 are first forwarding means composed of two sets of conveyor chains 4 arranged for movement in a second direction B transverse to the direction A. Connected between the chains A of each set are one or more guide bars 5 having their longitudinal axes extending in the direction A and, as can best be seen in FIGURE 1, arranged for movement past a guide rail 33, which is pivotable about a horizontal axis, and across the top of conveyor 1 in direction B. Whenever a guide bar 5 moving across the top of conveyor 1 encounters a carrier 3, whose length is at least equal to the distance between two chains 4 of each set and which may be long enough to extend completely across both sets of chains, the guide bar 5 pushes the carrier 3 off the conveyor 1 and causes it to be carried by chains 4 in the direction B. Each chain 4 is mounted between a sprocket wheel 32 disposed to one side of conveyor 1 and a drive sprocket 30 disposed to the other side of conveyor 1.

Disposed downstream of the first forwarding means are transfer means composed of an upper delivery belt 6 and a lower delivery belt 7. The upper delivery belt 6 is mounted between a forward guide shaft 34 and an upper drive shaft 35 and is arranged in the path of the dough portions being conveyed by the first forwarding means so as to lift these dough portions off their carrier 3 and to then drop the dough portions onto the lower delivery belt 7. Both delivery belts are connected to advance in the direction shown by the accompanying arrows and to deliver the dough portions 2 in a direction B' parallel to direction B toward the net conveyor 8, conveyor belt 7 having its downstream end disposed slightly above the upstream end of net conveyor 8. Belt 6 lifts each dough portion 2 from its carrier 3 and conveys the portion upwardly. When the portion passes over shaft 35 it drops onto belt 7. Net conveyor 8, which moves in the direction shown by its accompanying arrow, then conveys the dough portions away in a direction B'' parallel to direction B'.

The upstream end of delivery belt 7, which is the left-hand end in the view of FIGURE 1, is disposed just above the level of the fermentation carriers 3 so as to permit these carriers, from which the dough portions have been removed, to pass below belt 7 and to come under the driving influence of second forwarding means composed of a plurality of driven rollers, or shafts 9. The empty carriers are advanced by rollers 9 in the same direction B' as the dough portions 2 on belt 7 until arriving at the position shown for the carrier 3' (FIGURE 1), where their further advance is halted by a striker bar 47. The second forwarding means further includes a return guide mechanism provided with a chain 10 disposed between a guide wheel 48 and a drive wheel 49 for removing the empty fermentation carriers by conveying them away from the apparatus in the direction of the arrow C shown in FIGURE 2. As is shown most clearly in FIGURE 1, the chain 10 is preferably provided with a plurality of upwardly extending lugs which engage the empty fermentation carriers for urging them in the direction C. The chain 10 is preferably disposed between the shafts 9.

As is shown most clearly in FIGURE 2, the apparatus according to the present invention is provided with a first drive motor 11 having an output drive wheel connected to drive a chain sprocket 13 through the intermediary of a chain 12. Sprocket 13 is rigidly connected to a chain sprocket 14 by means of a common shaft and sprocket 14 is arranged to drive a further chain sprocket 16 by means of a short intermediate chain 15 (FIGURE 1). Chain sprocket 16 is rigidly connected to a shaft 17, as are two further chain sprockets 18 and 19.

Chain sprocket 18 is connected to drive a chain sprocket 21 through the intermediary of a chain 20, the sprocket 21 being mounted on a shaft 22 which extends across substantially the entire width of the apparatus. Chain sprocket 21 is connected to shaft 22 through the intermediary of a free-wheeling coupling, i.e., a one-way coupling.

The second chain sprocket 19 drives a chain sprocket 25 through the intermediary of a drive chain 24. Sprocket 25 supplies power for driving both belts 6 and 7 in a manner to be described in detail below.

The apparatus also includes a second drive motor 29 whose output is connected to a further chain sprocket 27 by way of a drive chain 28, sprocket 27 being operatively connected to shaft 22 through the intermediary of a second free-wheeling coupling 26. Thus, the shaft 22 may be driven by either the drive motor 11 or the drive motor 29.

Rigidly mounted for rotation with shaft 22 are the drive sprockets 30, driving chains 4, and a chain sprocket 31 connected to drive rollers 9 through the intermediary of a chain 46. Thus, chain sprocket 25, which drives belts 6 and 7, is always driven by motor 11, while chains 4 and rollers 9 may be driven either by drive motor 11 or drive motor 29, both operating through the intermediary of shaft 22. Since it is the chains 4 and rollers 9 which move carriers 3, it is possible to advance these carriers in a positive manner, and at a higher speed than that produced by motor 11, by actuating motor 29, this more rapid advance of the carriers not affecting the speed of belts 6 and 7.

Chain 10 is driven by a further drive motor 51 through the intermediary of a drive chain 50 passing around a chain sprocket 52 rigidly connected to drive wheel 49. The chain 46 driving roller shafts 9 is deflected over a guide wheel 45 in order to assure a positive engagement with the shafts 9.

The lower conveyor 7 extends essentially between an upstream guide shaft 37 and a downstream guide shaft 39. Between the shafts 37 and 39, the upper reach of belt 7 passes over an upwardly arched guide plate (not shown), or the like, while the lower reach of belt 7 passes over a lower guide shaft 38, two direction-reversing shafts 40 and 41, and a drive shaft 42 rigidly connected to sprocket 25 for driving belt 7. Upper delivery belt 6 is driven through the intermediary of a chain 36 connected between shaft 37 and the upper drive shaft 35 of belt 6. This connection assures that the upper reaches of both belts will advance the dough portions 2 in the same direction B'.

It is often desirable that the height of the drop experienced by the dough portions 2 when passing from the belt 7 to the net conveyor 8 be adjustable in accordance with the size and weight of the dough portions. This is achieved, according to a further novel feature of the present invention, by mounting the transfer means defined by belts 6 and 7 on a pivotable frame 43 (indicated in FIGURE 1 by dotted lines) which can be pivoted about the axis of shaft 37 so that its downstream end (the right-hand end in the view of FIGURE 1) can be moved in the direction of the double arrow D. This movement of frame 43 is effectuated by a conventional movable slide 44 (shown schematically) which supports the right-hand side of frame 43 and the transfer means which it carries.

It will be understood that the above description of the present invention is susceptible to various modifications, changes and adaptations, and the same are intended to be comprehended within the meaning and range of equivalents of the appended claims.

We claim:

1. Apparatus for conveying dough portions from fermentation carriers to the net conveyor of a baking oven, which apparatus comprises, in combination:
   (a) roller-type conveyor means for conveying loaded fermentation carriers in a first direction;
   (b) first forwarding means operatively associated with said conveyor means for forwarding the loaded carriers toward the net conveyor in a second direction transverse to said first direction, said forwarding means including at least one guide bar extending in said first direction and movable in said second direction across said conveyor for moving fermentation carriers in said second direction;
   (c) transfer means operatively associated with said forwarding means for removing the dough portions from the carriers and conveying them in said second direction to the net conveyor;
   (d) second forwarding means disposed beneath said transfer means for conveying the unloaded carriers beyond the front end of said transfer means; and
   (e) transport means operatively associated with said second forwarding means for carrying the unloaded carriers away in a direction transverse to said second direction.

2. An arrangement as defined in claim 1 wherein said first forwarding means comprise: at least one coupling chain carrying said at least one guide bar; at least one sprocket wheel around which said chain is disposed; at least one drive sprocket about which said chain is disposed and arranged for driving said chain; and driving means operatively associated with said drive sprocket for selectively driving said sprocket either at a first speed corresponding to the travel speed of said transfer means or at a higher speed.

3. An arrangement as defined in claim 2 wherein said transfer means comprise two delivery belts extending toward the net conveyor, one of said belts having a forward end which extends beneath the dough portions as they are carried by said at least one coupling chain, and the other of said belts having its forward end extending just above the level of the fermentation carriers and its rear end disposed over the net conveyor.

4. An arrangement as defined in claim 3 wherein said transfer means are mounted on a pivotable frame, said arrangement further comprising positioning means operatively connected to said frame for adjusting the vertical position of the rear end of said other belt relative to the net conveyor.

5. An arrangement as defined in claim 4 further comprising: a first drive motor connected for driving said belts; drive chain means connected between said motor and said belts; first free-wheeling means connecting said drive chain means to said forwarding means; a second drive motor; and second free-wheeling means connecting said second drive motor to said forwarding means.

6. An arrangement as defined in claim 5 further comprising a shaft drivingly connecting said free-wheeling means to said forwarding means.

7. An arrangement as defined in claim 6 further comprising: a sling chain arranged for movement in a direction transverse to said second direction; and a plurality of upwardly extending lugs connected to said sling chain for engaging the lateral sides of the emptied fermentation carriers.

8. An arrangement as defined in claim 4 wherein said frame is pivotable about a horizontal axis located at the forward end of said other belt.

References Cited

UNITED STATES PATENTS

| | | | |
|---|---|---|---|
| 2,975,920 | 3/1961 | Reed | 214—309 |
| 3,325,025 | 6/1937 | Irving | 214—309 |

GERALD M. FORLENZA, *Primary Examiner.*

GEORGE F. ABRAHAM, *Assistant Examiner.*